US010526231B1

(12) United States Patent
Waugh et al.

(10) Patent No.: US 10,526,231 B1
(45) Date of Patent: Jan. 7, 2020

(54) FUSED SILICA AND METHOD OF MANUFACTURE

(75) Inventors: John Stanley Waugh, Wellesley, MA (US); Joseph Matthew Wahl, Shirley, MA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 07/395,868

(22) Filed: Aug. 18, 1989

(51) Int. Cl.
| | |
|---|---|
| *C03B 19/09* | (2006.01) |
| *C03C 3/06* | (2006.01) |
| *C04B 35/14* | (2006.01) |
| *C03B 19/06* | (2006.01) |

(52) U.S. Cl.
CPC .............. *C03B 19/066* (2013.01); *C03C 3/06* (2013.01); *C04B 35/14* (2013.01)

(58) Field of Classification Search
CPC .......... C03C 3/06; C04B 35/14; C03B 19/066
USPC .................................................. 501/54, 133
See application file for complete search history.

(56) References Cited

U.S. PATENT DOCUMENTS

| | | | | |
|---|---|---|---|---|
| 3,207,612 | A | * | 9/1965 | Martin ........................... 501/133 |
| 3,301,635 | A | * | 1/1967 | Bergna et al. ................. 501/133 |
| 4,033,780 | A | * | 5/1977 | Baumgartner et al. ........ 501/133 |
| 4,506,025 | A | * | 3/1985 | Kleeb et al. ................... 501/133 |

FOREIGN PATENT DOCUMENTS

| | | | | |
|---|---|---|---|---|
| DE | 0260921 | * | 10/1988 | ............. C04B 35/14 |
| JP | 0043849 | * | 11/1977 | .................... 501/133 |
| JP | 0136179 | * | 10/1980 | .................... 501/133 |

OTHER PUBLICATIONS

Fused Silica Radome Manufacturing Processess, N. B. Castrodale et al., Proceedings of Second DOD EM. Windows Symposium, Oct. 1987, p. 121-32, AEDC-TR-87-21.
Improved Process for Making Dense Vitreous Silica from Submicrometer Particles by Sintering Near 1000°C, William J. Clegg et al., Mar. 1989, p. 432-36, Journal of the American Ceramic Society, vol. 72, No. 3.
Hot Pressing of Fused Silica, Thomas Vasilos, Oct. 1960, p. 517-19, Journal of the American Ceramic Society, vol. 43, No. 10.
Preparation of $SiO_2$ Galss from a Model Powder Compacts: I, Formation and Char-acterization of Powders, Suspensions, and Green Compacts, Michael D. Sacks et al., Aug. 1984, p. 526-32, Journal of the American Ceramic Society, vol. 67, No. 8.
Casting of Monodisperse Colloidal Silica, M. Velazquez et al., Advances in Ceramics, vol. 9, p. 105-14, Forming of Ceramics, The American Ceramic Society.
Review Preparation of Glass by Sintering, E.M. Rabinovich, 1985, p. 4259-4297, Journal of Materials Science, vol. 20.
Controlled Growth of Monodisperse Silica Spheres in the Micron Size Range, Werner Stober et al., 1968, p. 62-69, Journal of Colloid and Interface Science, vol. 26.

(Continued)

*Primary Examiner* — Karl E Group
(74) *Attorney, Agent, or Firm* — Raytheon Company

(57) ABSTRACT

A processing technique for production of fused silica for radomes and like elements is described. The processing technique includes forming a mixture of milled silica having an average particle size of about 1 to 5 microns, and a colloidal silica. This mixture is processed to form fused silica having substantially high strength.

30 Claims, 3 Drawing Sheets

(56) References Cited

OTHER PUBLICATIONS

Preparation of $SiO_2$ Glass from Model Powder Compacts: II, Sintering, Michael D. Sacks et al., Aug. 1984, p. 532-37, Journal of the American Ceramic Society, vol. 67 No. 8.

\* cited by examiner

FUSED SILICA AND METHOD OF MANUFACTURE

BACKGROUND OF THE INVENTION

This invention relates generally to materials and more particularly to materials which are transparent to radio frequency energy.

As is known in the art, there is a need for durable and strong components comprised of materials which have a high degree of radio frequency transparency. One application for such materials is as a radome to isolate a radar system from an external environment. Such radomes are often used on flight vehicles such as active or semi-active guided missiles.

One material used in the art for providing radomes is so-called "slip cast fused silica". Silica (silicon dioxide) is one of a limited class of materials which has a very high viscosity at its softening temperature. This characteristic permits silica to form as either a vitreous material (i.e. glass), that is a material having no apparent crystal structure commonly referred to as fused silica, or alternatively, as a devitrified material that is a material having a definite crystal structure (i.e. ceramic).

For radomes used on flight vehicles, vitreous or fused silica material is generally used. Fused silica, the name given to the vitreous form, is preferred over devitrified or crystalline silica because the fused silica has a relatively low and isotropic thermal expansion coefficient compared to devitrified or crystalline silica. That is, fused silica has a coefficient of thermal expansion which is substantially independent of temperature over a relatively wide range of operating temperatures. This property of fused silica permits radomes of fused silica to exhibit excellent thermal shock resistance ($T_s$). Thermal shock resistance is generally characterized by the equation $T_s = \sigma \cdot K / E \cdot \alpha$, where $\sigma$ is strength, K is the thermal conductivity of the material, E is Young's Modulus, and $\alpha$ is the coefficient of thermal expansion.

One technique used for making fused silica bodies is so-called slip casting. In the slip cast technique, an aqueous slurry of silica cullet is prepared and introduced into a mold comprised of a material such as plaster of paris having the desired shape and size. The plaster of paris mold has the capacity for withdrawing water from the aqueous slurry leaving behind a rigid cast of silica which forms on the inside of the plaster of paris mold. The rigid cast is removed from the mold and allowed to finish drying over a period of several weeks until the cast has a green or pre-fired density in the range of 85% to 90% of theoretical density. During this drying process, controlled humidity environments are often used to prevent cracks from forming and propagating in the green cast. The green cast is then fired or sintered to achieve a final density of about 89%-90% of theoretical density.

Thus, fused silica fabricated for radome applications has so-called open porosity or small micropores which are disposed throughout the material. These micropores inhibit the propagation of surface flaws and cracks through the material which otherwise could cause a catastrophic failure of the radome. Crack propagation is often initiated by water droplet impact or so-called rain erosion which occurs when the radome traverses a rain field at a high velocity. The pores in the fused silica serve to retard such crack propagation. A material such as silicone is impregnated into the pores to prevent water from entering the radome. Water absorption in fused silica will cause undesirable r.f. absorption bands in the material. Such absorption is undesirable for radome applications.

Slip casting is a relatively expensive and time consuming process having a relatively low yield because of the critical yet slow drying step required to achieve the high green state density. Moreover, the sintering employed to achieve final density is also not particularly effective in strengthening the slip cast fused silica because the sintering must occur in this process over relatively short time and low temperature conditions. Higher time and temperature conditions are necessary to achieve additional strengthening of the slip-cast sintered, fused silica. However, higher time and temperature sintering conditions will close-off pores in the fused silica and will also cause the silica to crystallize and form "crystobalite". Formation of a significant crystobalite phase in the fused silica is particularly undesirable, since the crystobalite provides the radome with an anisotropic component of thermal expansion which reduces the overall thermal shock resistance of the radome.

For a given density, conventional slip cast fused silica has a relatively low flexural strength characteristic. Typically, the flexural strength of slip cast fused silica having a density of 1.95 g/cm$^3$ (approximately 88.6% of theoretical density) is about 6600 psi.

The microstructure of conventional slip cast fused silica is generally as that shown in FIG. 3A. This microstructure exhibits a preponderance of particles having an average size of 30 to 50 microns. Moreover, the microstructure is in general coarse and irregular in morphology which leads to the relatively low strength characteristic mentioned above.

SUMMARY OF THE INVENTION

In accordance with the present invention, a method of providing a fused silica body includes the steps of forming a mixture of a starting powder of silica having a predetermined average particle size and a predetermined maximum particle size characteristic and a finely divided particle suspension of silica particles having an average and a maximum particle size such that the silica particles remain substantially in suspension in a suspending agent. Said mixture is then formed into a densified silica body of a predetermined size and shape. With this particular arrangement, a highly reactive, silica mixture is provided. The finely divided silica has a relatively high total surface area compared to that of the starting powder. This provides the relatively highly reactive silica mixture. This mixture can be consolidated into a rigid body having a relatively low green or pre-fired density. This body is fired to achieve final density, while significantly strengthening the material of the body without causing the material to crystallize.

In accordance with a further aspect of the present invention, a method of providing a fused silica body includes the steps of forming a slurry including a silica starting powder having an average particle size in the range of about 1 to 5 microns and a maximum particle size of less than about 10 microns and finely divided silica particles having an average particle size in the range of about 10 to 50 nm. The slurry is spray dried to provide small, uniformly shaped agglomerates of silica. These agglomerates which include the silica powder interspersed with the finely divided silica particles are introduced into a mold. The mold containing the silica agglomerates is subjected to an isostatic pressure to consolidate the agglomerates into a body. The consolidated body is then sintered for a predetermined period of time over a predetermined temperature range to further densify the body to a final desired density. With this particular arrangement, free-flowing silica agglomerates of uniform size and shape are provided. Such agglomerates are easily introduced into a rubber mold or the like selected to provide a body of predetermined size and shape. Moreover, the agglomerates have a high degree of surface reactivity, and thus the silica particles may be isostatically pressed to consolidate the particles into the body of desired shape. Isostatic pressing is a less expensive and faster processing step than drying of a slip cast in a plaster of paris mold. The consolidated body is then sintered to provide the body of a desired, final density under temperature and time conditions which avoid formation of an undesirable crystalline phase in the silica material while significantly strengthening the silica material.

In accordance with a further aspect of the present invention, a body comprised of fused silica has a strength characteristic which is about 20% to 50% higher than the strength characteristic of conventional slip cast fused silica material of a comparable density. This strength characteristic is provided without significantly altering in an adverse manner, the properties of the material which make it desirable for r.f. radome applications.

Such a body may also be characterized by a microstructure which is relatively uniform. Particles in said fused silica are generally less than about 1 to 5 microns in size.

BRIEF DESCRIPTION OF THE DRAWINGS

The foregoing features of this invention, as well as the invention itself, may be more fully understood from the following detailed description of the drawings, in which.

DESCRIPTION OF THE PREFERRED EMBODIMENTS

Fabrication of fused silica bodies in accordance with the present invention will be described in conjunction with the process flow diagrams of FIGS. 1 and 2.

Figure 1:
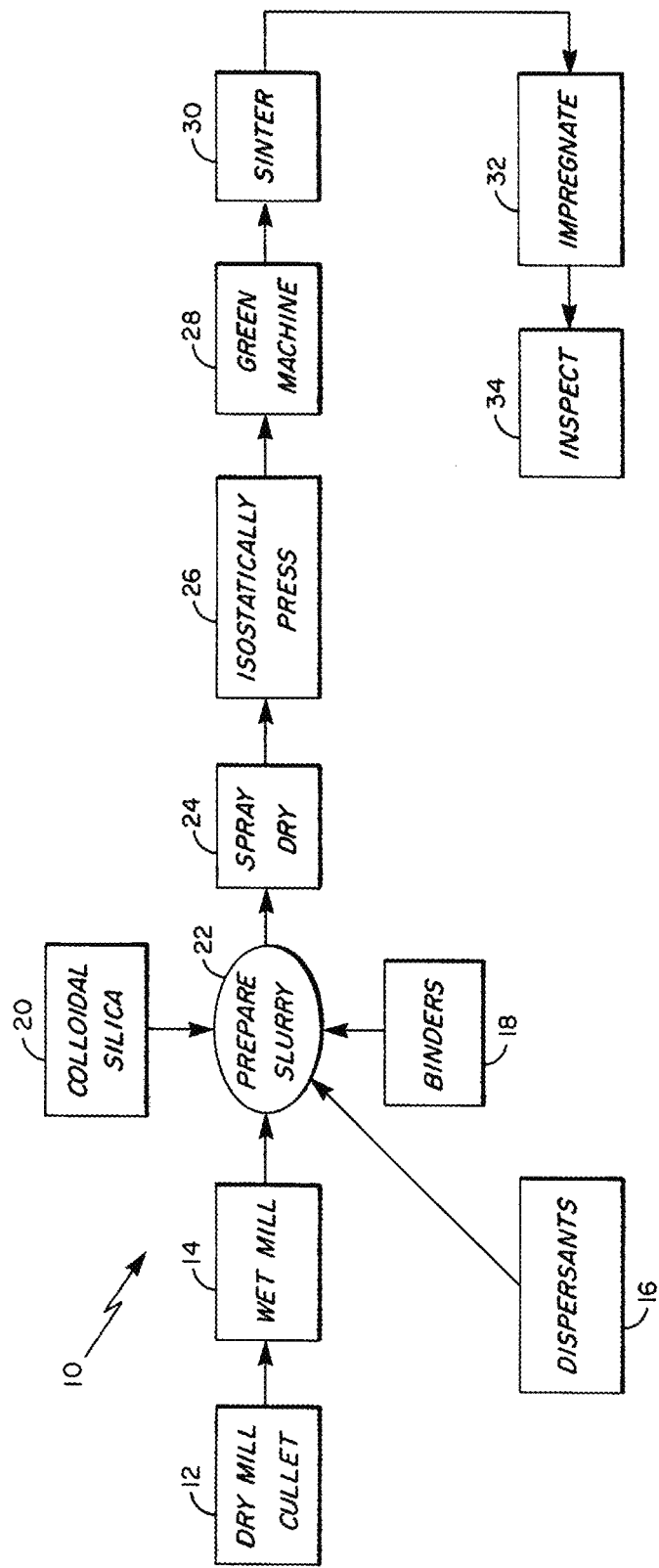
FIG. 1 is a process flow diagram representing a first preferred sequence of steps for providing fused silica in accordance with the present invention.

Referring first to FIG. 1, a first sequence 10 for providing fused silica bodies is shown. Silica cullet is here used as a raw source of silica material. Silica cullet is silica material which is left over from manufacture of silica containing objects such as lightbulbs and the like. The silica cullet is dry milled 12 to initially reduce the particle size of the cullet to a level that can be accommodated by a wet ball milling operation. The dry milling media typically used is 96% $Al_2O_3$ 2" spherical balls. The dry milling continues until particle size is typically less than about 840 μm.

Wet ball milling 14 is then performed on the dry milled cullet to reduce the particle size of the silica cullet even further. Wet milling continues until a starting powder is formed having an average particle size of approximately 3 microns or generally in the range of 1 μm to 5 μm and an absolute maximum particle size of about 10 microns. However, other particle size ranges are possible and may be preferred depending upon particular requirements of the finished product such as pore size and pore distribution.

After the silica cullet has been reduced to the desired particle size, here an average particle size of 3 microns and an absolute particle size of 10 microns, a slurry 22 including the cullet is prepared by introducing water into the starting powder and by introducing here colloidal silica 20 in weight percentages of here 10%-40% colloidal silica to silica cullet. The colloidal silica can be introduced either already in colloidal suspension or as a dry powder. Colloidal silica here used is Cab-O-Sil M-5 and L-90, or Cab-O-Sperse A-1095, obtained from Cabot Corp., Tuscola, Ill. The phrase "colloidal silica" is here used to describe finely divided silica particles which have an average particle size and maximum particle size such that they remain in a colloidal suspension in an agent such as water due to sterric repulsion forces existing between the individual silica particles. Typically, such particles will have a particle size of about 10 nanometers (nm) or less up to about 50 nm. Here the finely divided particles had average sizes in the range of about 14 nm to 24 nm.

The slurry is further prepared by introducing dispersants 16 such as Darvan C or Darvan 821A obtained from R.T. Vandebuilt, Norwalk, Conn. The dispersants are used to reduce the viscosity of the slurry which aids in drying the slurry as will be described. The dispersants also aid in maintaining the finely divided silica particles in colloidal suspension. Binders 18 are also introduced into the slurry. Binders such as Arolon, 580 and 585 alkyd type resins from N.L. Chemical Highstown, N.J. or other binders such as Dow XUS 40303.00, polyvinylpyrrolidon (PVP) mixed with $H_2O$, or Polysar AL603 or AL609 acrylic latexes from Polysar Ltd., Canada may alternatively be used. The binders are used to help keep the silica starting powder bound with the finely divided silica particles after drying as will be described.

The slurry comprised of the milled silica cullet material, colloidal silica, dispersants, and binders is passed through a spray dryer such as a gas fired, reverse flow two fluid nozzle (not shown). The spray is directed into a chamber (not shown) filled with hot gases such as air disposed at a typical temperature of 200° C., to cause a flash evaporation of water from the slurry and subsequent formation of round or uniformly shaped spheres or agglomerates of the milled cullet silica interdispersed with the finely divided particles and the binders. These spherical agglomerates are free-flowing and are easily poured or introduced into a mold having substantially the desired size and shape for the body to be fabricated. It is to be understood that subsequent densification steps will reduce the size of the body by about 17%.

The mold containing the spherical particles is placed in a cold isostatic press 26 to consolidate the spherical particles into a rigid body having a green density of typically 50% of theoretical density. Typical isostatic pressing conditions are: a pressure in the range of 10,000 to 25,000 psi at a temperature of about 25° C. The body at this point has sufficient rigidity so that it may be optionally "green machined" 28 to substantially final desired sizes and shapes using any conventional machining process. After the optional green machining step, the body is sintered 30 to achieve a final density of typically 89%-91% of theoretical density. Higher densities, although not preferred for radomes may nevertheless be achieved by further sintering. Sintering of the machined, isostatically pressed body occurs at a temperature in the preferred range of 1100° C. to 1225° C. more preferable in the range of 1175° C. to 1200° C. over a preferred period of time of 4 hours to 8 hours. Other sintering conditions may alternatively be used. After sintering, the densified body is impregnated 32 with a material such as silicone which prevents the body from absorbing water through its open pores. The body may then be inspected 34 and any final machining may be provided such as diamond grinding to achieve final design specifications.

Material was fabricated in accordance with the flow process of FIG. 1. Table I shows typical preferred formulations, and Table II shows firing parameters and the final density and strength of the material.

TABLE I

| Formulation | Colloid/ SiO$_2$ | D.I.H$_2$O | NH$_4$OH | Darvan®C | Binder | Cab-O-Sil® | Silica |
|---|---|---|---|---|---|---|---|
| 1 | 20/80 | 400 ml | 5 g | 3 g | 6 g PVP | 40 g M-5 | 160 g |
| 2 | 30/70 | 400 ml | 5 g | 3 g | 6 g PVP | 60 g M-5 | 140 g |
| 3 | 30/70 | 400 ml | 5 g | 3 g | 6 g Arolon®585 | 60 g L-90 | 140 g |
| 4 | 30/70 | 400 ml | 5 g | 3 g | 6 g Dow XUS | 60 g L-90 | 140 g |
| 5 | 30/70 | 400 ml | 5 g | 3 g | 6 g PolysaAL 603 | 60 g L-90 | 140 g |
| 6 | 40/60 | 400 ml | 5 g | 3 g | 6 g PVP | 80 g M-5 | 120 g |

TABLE II

| Formulation | Firing Temperature | Firing Time | Density | Flexure Strength |
|---|---|---|---|---|
| 1 | 1175° C. | 4 hr. | 1.37 g/cm$^3$ | not measured |
| 2 | 1200° C. | 6 hr. | 1.87 g/cm$^3$ | 8590 psi |
| 2 | 1225° C. | 8 hr. | 1.93 g/cm$^3$ | 9660 psi |
| 3 | 1200° C. | 8 hr. | 2.04 g/cm$^3$ | 10870 psi |
| 3 | 1225° C. | 8 hr. | 2.13 g/cm$^3$ | 11300 psi |
| 4 | 1175° C. | 4 hr. | 1.69 g/cm$^3$ | 6780 psi |
| 4 | 1200° C. | 4 hr. | 1.93 g/cm$^3$ | 9460 psi |
| 4 | 1200° C. | 8 hr. | 2.05 g/cm$^3$ | 11330 psi |
| 6 | 1175° C. | 4 hr. | 2.02 g/cm$^3$ | 9340 psi |

In each example above, the measured flexural strength is at least 20% to 50% higher than conventional slip cast fused silica material. For example, material at a density of 1.93 g/cm$^3$ had a measured flexural strength for the examples above of 9660 psi and 9460 psi. These values are about 43% higher than the prior art material. In each instance, the crystobalite content is less than 1.5%, and often less than about 1%.

Figure 2:
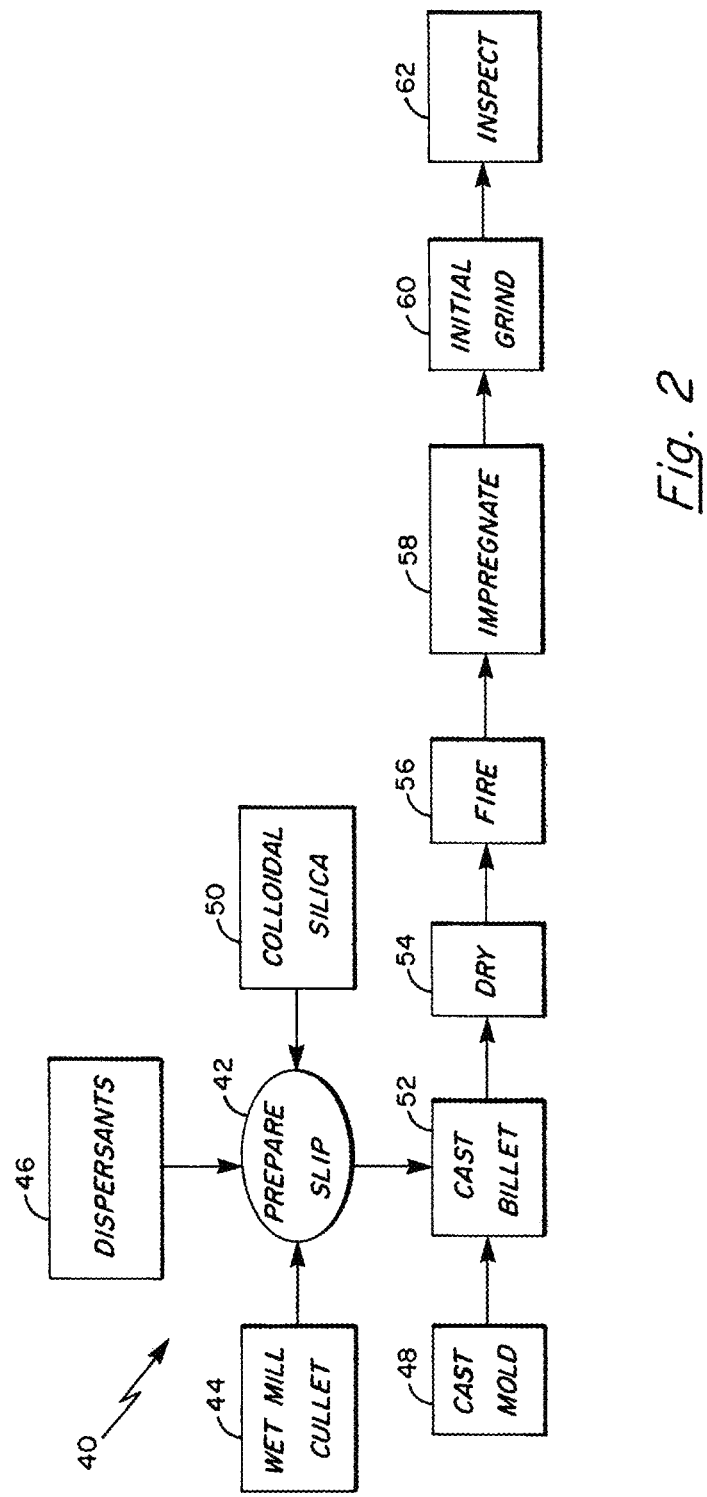
FIG. 2 is a process flow showing an alternative preferred sequence of steps for providing fused silica in accordance with a further aspect of the present invention.

Referring now to FIG. 2, an alternate, preferred sequence of steps 40 for providing a fused silica body is shown. A slip 42 is prepared by introducing wet milled cullet 44 as generally described above in conjunction with step 14 of FIG. 1, colloidal silica 50 as also described above in conjunction with step 20 of FIG. 1 and dispersants 46 such as those described above are also added to the slip 42. Concurrently or prior thereto, a mold is cast 48 from here plaster of paris having roughly the desired shape and size for the finished silica body. The slip 42 including the milled silica cullet and colloidal silica is introduced into the mold during the cast billet step 52. The billet contained in the mold is allowed to dry 54 by letting the plaster of paris absorb water from the slip to provide a leatherly-like layer of silica on the inside of the plaster of paris mold. The plaster of paris mold is then removed and the leather-like billet is allowed to dry in a controlled humidity environment until substantially complete drying has occurred. After the billet has dried, the billet is fired or sintered 56 at temperatures in the range of 1100° C. to 1175° C. over a period of time of 4 hours to 8 hours to finally densify the body. The body is impregnated 58 with silicone, such that the silicone occupies the open porosity of the body to prevent water absorption as described earlier. The body is ground and finished 60 to desired specifications. Then, the body may be inspected 62 and any final grinding or polishing performed.

Due to the presence of the colloidal silica, and the controlled particle size, significant strengthening of the silica occurs during sintering without causing a significant crystobalite phase from developing.

Material was also fabricated with the slip cast process using the above described powder processing technique. Tables III and IV give a typical formulation and typical densification process conditions.

TABLE III

| Formulation: | 200 ml | Deionozed Water |
|---|---|---|
|  | 3 g | Ammonium Hydroxide |
|  | 3 g | Darvan ®C |
|  | 60 g | Cab-O-Sil ®L-90 |
|  | 140 g | Control Ground Silica |

This material is thoroughly mixed by an appropriate technique (ball milling, ultrasonic dispersion, high shear mixing, etc.) and poured into a plaster of paris mold and allowed to dry in the usual manner for slip casting. The dried part is then fired. Typical results are as follows.

TABLE IV

| Temperature | Time | Shrinkage | Density | Porosity |
|---|---|---|---|---|
| 1100° C. | 4 hrs. | 3.5% | 1.51 g/cm$^3$ | 31% |
| 1150° C. | 4 hrs. | 13.3% | 2.08 g/cm$^3$ | 4% |
| 1175° C. | 4 hrs. | 15.1% | 2.19 g/cm | 0.1% |

The resulting flexure strength from the sample fired at 1150° C. for 4 hrs. is 10,710 psi. This strength is also significantly higher than the conventional fused silica material by approximately 40%. The crystobalite content is also less than about 1%.

Figure 3A:
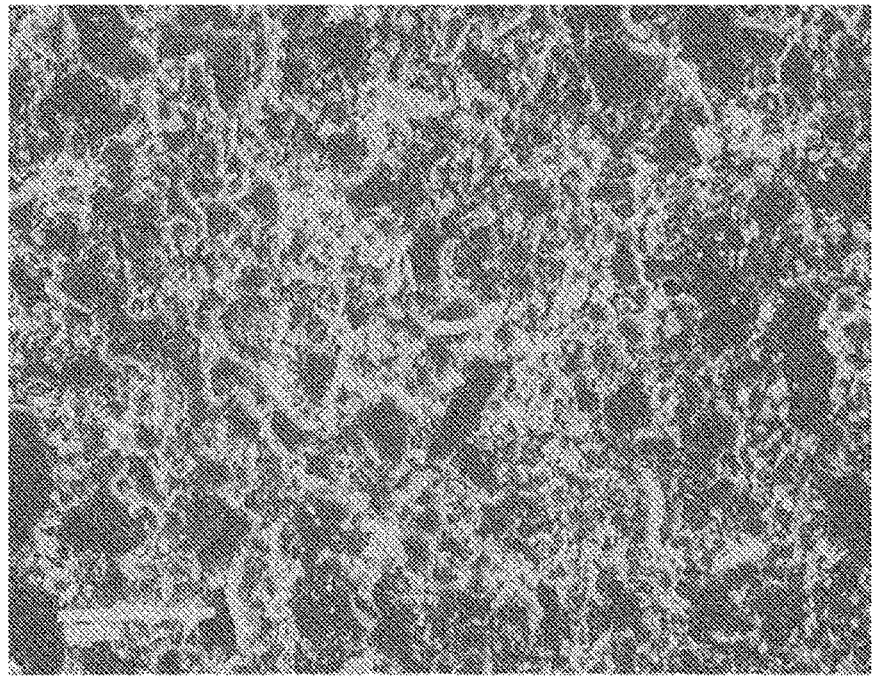
FIG. 3A is a photomicrograph of the typical microstructure of slip cast fused silica of the prior art.
Figure 3B:
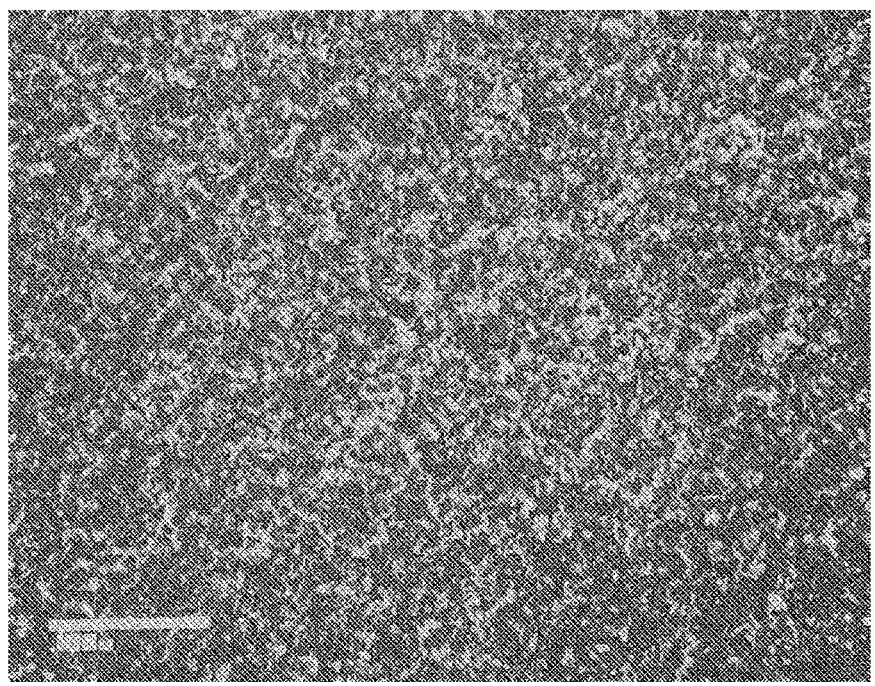
FIG. 3B is a photomicrograph of the typical microstructure of fused silica made in accordance with the present invention.

Referring now to FIGS. 3A, 3B, the microstructure of two samples of silica bodies is shown. FIG. 3A shows the microstructure of slip cast material made with conventional starting powder. The conventional material has a very coarse microstructure with many large coarsely milled fused silica particles being evident. Such a coarse and irregular microstructure introduces large pores within the material which act as stress risers or stress concentration points. This limits the ultimate strength of the fused silica material and thus accounts for the relatively low strength of the conventional slip cast fused silica material. Generally, the microstructure of the conventional material includes a preponderance of particles having a size in the range of about 30-50 microns, as shown in FIG. 3A.

Referring now to FIG. 3B, the microstructure of isostatically pressed fused silica as generally described in FIG. 1 is shown. This fused silica has a very fine and uniform microstructure. The size of the particles in this material is generally less than about 3 microns with no particles having a particle size greater than about 10 microns. Such a microstructure is desirable to provide a body having a relatively high strength characteristic. Isostatically pressed fused silica material generally exhibits a flexural strength characteristic which is approximately 20% to 50% greater than the corresponding characteristic of the slip cast fused silica using the conventional starting powder. These flexural strength characteristics are determined from materials having substantially similar density and crystobalite content generally less than about 1.5% crystobalite.

The strength and microstructure characteristics of slip cast material using the novel starting powder and processing as described in conjunction with FIG. 2 is expected to be similar to that shown in FIG. 3B for the isostatically pressed fused silica material. This assumption clearly follows since the characteristics of the starting powder, that is the average and maximum particle size characteristics and finely divided particles determined in large part the microstructure of the finished product.

Having described preferred embodiments of the invention, it will now become apparent to one of skill in the art that other embodiments incorporating their concepts may be used. It is felt, therefore, that these embodiments should not be limited to disclosed embodiments, but rather should be limited only by the spirit and scope of the appended claims.

What is claimed is:

1. A method of forming a densified body of fused silica comprising the steps of:
    forming a mixture of a starting powder of silica having a maximum particle size of about 10 microns, and finely divided silica particles having an average and maximum particle size characteristic such that said finely divided particles remain substantially in suspension in said mixture; and
    forming said mixture into the densified body of silica.

2. The method of claim 1 wherein said mixture is an aqueous mixture.

3. The method of claim 2 wherein the starting powder has an average particle size in the range of about 1 to 5 microns.

4. The method of claim 3 wherein the mixture has an initial viscosity characteristic and wherein the forming step further comprises the step of introducing a material having a relatively low viscosity compared to the initial viscosity of the mixture to reduce the viscosity of the mixture.

5. The method of claim 4 wherein said low viscosity material is a dispersant and is added to aid in keeping the finely divided silica particles suspended in the mixture.

6. The method of claim 5 wherein the forming step further comprises the steps of:
    consolidating the mixture into the body having approximately the size and shape characteristic of the final densified body; and
    firing the consolidated body at a temperature and over a period of time to provide the densified body.

7. The method of claim 6 wherein the temperature and time duration of the firing step are selected to provide substantially pure fused silica having a crystalline phase content less than about 1% by weight.

8. The method of claim 7 wherein the temperature of the firing step is in the range of about 1100° C. to 1250° C. for a period of time in the range of 4 hours to 8 hours.

9. A method of forming silica agglomerates comprising the steps of:
    forming a aqueous mixture of a starting powder of silica having an average particle size in the range of about 1 micron to 5 microns and a maximum particle size of about 10 microns, and of finely divided silica particles having an average and maximum particle size characteristic such that said finely divided particles remain substantially in suspension in said aqueous mixture; and
    providing from said mixture silica agglomerates of uniform shape comprising said starting powder of silica interspersed with said finely divided silica particles.

10. The method of claim 9 further comprising the step of introducing a binder into said mixture to assist in keeping the finely divided silica particles bound with the starting powder in the silica agglomerates; and
    said providing step includes the step of removing water from said mixture to provide the silica agglomerates.

11. The method of claim 10 wherein said water removing occurs by spraying the aqueous mixture into a chamber containing an elevated temperature atmosphere to flash evaporate water from said aqueous mixture to provide the agglomerates of silica.

12. A method of providing a fused silica radome transparent to r.f. energy comprises the steps of:
    providing a starting powder of fused silica particles having an average particle size in the range of about 1 micron to 5 microns and a maximum particle size of about 10 microns;
    forming an aqueous mixture of said starting powder of fused silica and colloidal finely divided silica particles having a maximum particle size in the range of about 10 nanometers to 50 nanometers;
    removing water from said aqueous mixture to provide small agglomerates of silica starting powder and finely divided silica particles having a uniform shape;
    introducing said agglomerates of silica into a mold;
    subjecting said mold containing said silica agglomerates to an isostatic pressure to consolidate said agglomerates into a body; and
    sintering said body for a period of time over a temperature range to densify said body to obtain a final density of about 89 to 91% of theoretical density.

13. The method of claim 12 further comprising the step of adding a binder to said aqueous mixture prior to the step of removing water, to aid in keeping the finely divided silica particles bound with the starting powder.

14. The method of claim 12 wherein said finely divided silica particles have an average particle size in the range of about 14 to 24 nanometers.

15. The method of claim 13 therein said finely divided particles of silica have an average particle size in the range of about 14 to 24 nanometers.

16. The method of claim 15 wherein said removing step includes the step of spraying said aqueous mixture into an elevated temperature atmosphere to flash evaporate water from the aqueous mixture to provide the agglomerates.

17. The method of claim 16 wherein said subjecting step occurs at a pressure of 10,000 psi to 25,000 psi at approximately 25° C.

18. The method of claim 12 wherein the colloidal silica is approximately 10% to 40% of the silica in said mixture.

19. The method of claim 17 wherein the colloidal silica is approximately 10% to 40% of the silica in said mixture.

20. The method of claim 12 wherein the colloidal silica is approximately 30% by weight of the silica in said mixture.

21. The method of claim 17 wherein the colloidal silica is approximately 30% by weight of the silica in said mixture.

22. A method of forming fused silica comprising the steps of:

providing an aqueous mixture of a starting powder of silica having an average particle size of about 1 micron to 5 microns and a maximum particle size of about 10 microns, and a finely particle suspension of silica;

introducing said mixture into a mold comprised of a material which removes water from said aqueous mixture to allow said mixture to dry and provide a rigid body having substantially all of the water removed; and firing said rigid, dried body over a period of time and at a temperature to provide the body with a density in the range of about 89 to 91% of theoretical density.

23. The method of claim 22 wherein said material of said mold is plaster of paris.

24. The method of claim 22 wherein said colloidal silica particle has an average particle size in the range of about 10 to 50 nanometers.

25. The method of claim 23 wherein said colloidal silica particle has an average particle size in the range of about 14 to 24 nanometers.

26. The method of claim 25 wherein said mold is comprised of plaster of paris.

27. A body comprised of at least about 98.5% vitreous silica having a substantially fine and uniform microstructure of fused particles having an average particle size of in the range about 1 micron to 5 microns and maximum particle size of about 10 microns.

28. A body comprising at least about 98.5% vitrified silica having a strength characteristic of at least about 8500 psi for said silica having a density of at least about 1.87 g/cm$^3$.

29. The body of claim 28 further characterized by a microstructure of fused silica particles which is substantially fine and uniform having an average particle size of less than about 1 micron to 5 microns and maximum particle size of about 10 microns.

30. The body of claim 28 having a strength characteristic of at least 9000 psi for said silica having a density of at least about 1.93 g/cm$^3$.

* * * * *